(12) United States Patent
Yoon et al.

(10) Patent No.: US 12,083,859 B2
(45) Date of Patent: Sep. 10, 2024

(54) VEHICULAR AIR CONDITIONING SYSTEM

(71) Applicant: Hanon Systems, Daejeon (KR)

(72) Inventors: Seo Jun Yoon, Daejeon (KR); Sang Ki Lee, Daejeon (KR); Yong Sik Kim, Daejeon (KR); Seung Ho Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 131 days.

(21) Appl. No.: 17/797,566

(22) PCT Filed: Feb. 16, 2021

(86) PCT No.: PCT/KR2021/001943
§ 371 (c)(1),
(2) Date: Aug. 4, 2022

(87) PCT Pub. No.: WO2021/172802
PCT Pub. Date: Sep. 2, 2021

(65) Prior Publication Data
US 2023/0063307 A1    Mar. 2, 2023

(30) Foreign Application Priority Data
Feb. 27, 2020  (KR) .......................... 10-2020-0024115

(51) Int. Cl.
*B60H 1/00* (2006.01)
(52) U.S. Cl.
CPC ..... *B60H 1/00842* (2013.01); *B60H 1/00064* (2013.01); *B60H 1/00678* (2013.01); *B60H 2001/00092* (2013.01); *B60H 2001/00707* (2013.01)

(58) Field of Classification Search
CPC ............ B60H 1/00842; B60H 1/00064; B60H 1/00678; B60H 1/00857; B60H 1/00671; B60H 2001/00092; B60H 2001/00707; B60H 2001/002
See application file for complete search history.

(56) References Cited

U.S. PATENT DOCUMENTS

| | | | |
|---|---|---|---|
| 6,352,102 B1 * | 3/2002 | Takechi ............. | B60H 1/00849 165/203 |
| 2006/0027354 A1 | 2/2006 | Vincent et al. | |
| 2017/0305229 A1 * | 10/2017 | Spryshak ........... | B60H 1/00021 |

FOREIGN PATENT DOCUMENTS

| | | |
|---|---|---|
| JP | 2016155417 A | 9/2016 |
| KR | 101220971 B1 | 1/2013 |
| KR | 20160066124 A | 6/2016 |
| KR | 20180068761 A | 6/2018 |

* cited by examiner

*Primary Examiner* — Marc E Norman
(74) *Attorney, Agent, or Firm* — Norton Rose Fulbright US LLP; James R. Crawford

(57) ABSTRACT

A vehicular air conditioning system provided with a cooling heat exchanger and a heating heat exchanger includes a cold air flow path through which an air passing through the cooling heat exchanger bypasses the heating heat exchanger, a hot air flow path through which the air passing through the cooling heat exchanger passes, a plurality of temperature doors configured to allow the air passing through the cooling heat exchanger to selectively pass through the heating heat exchanger, and an interlocking part configured to allow the temperature doors to be driven in conjunction with each other.

13 Claims, 7 Drawing Sheets

PRIOR ART

PRIOR ART

VEHICULAR AIR CONDITIONING SYSTEM

CROSS REFERENCE TO RELATED APPLICATIONS

This application is a national phase under 35 U.S.C. § 371 of International Application No. PCT/KR2021/001943 filed on Feb. 16, 2021, which claims the benefit of priority from Korean Patent Application No. 10-2020-0024115 filed on Feb. 27, 2020. The entire contents of this application is incorporated herein by reference in their entirety.

TECHNICAL FIELD

The present invention relates to a vehicular air conditioning system, and more particularly, a vehicular air conditioning system configured to control a sub temperature door without a separate actuator, so that the number of parts can be reduced and the cost reduction can be achieved through the reduction of the number of parts.

BACKGROUND ART

In recent years, an individual air conditioning system for independently cooling and heating a plurality of regions in a vehicle interior has been developed. For example, an individual air conditioning system that independently cools and heats a driver seat region, a front passenger seat region and a rear seat region has been developed and used.

As shown in FIG. 1, the individual air conditioning system has a structure in which an air flow path of an air conditioning case 10 is divided into air flow paths for respective seats, for example, a driver seat air flow path 12, a front passenger seat air flow path 14 and a rear seat air flow path 16, and temperature doors 20, 22 and 24 are installed in the air flow paths 12, 14 and 16 for respective seats.

In such an individual air conditioning system, when a user operates an individual air conditioning mode switch (not shown) and a temperature control switch (not shown) for each air conditioning region, the temperature door 20, 22 and 24 in the air flow paths 12, 14 and 16 are controlled independently.

Therefore, the temperature of the air supplied to each air conditioning region is individually controlled to individually cool and heat each air conditioning region.

Meanwhile, as shown in FIG. 2, each of the temperature doors 20 and 22 in the driver seat air flow path 12 and the front passenger seat air flow path 14 includes a main temperature door 20a or 22a and a sub temperature door 20b or 22b. In this case, the main temperature door 20a or 22a rotates between a cold air flow path 10a and a hot air flow path 10b to adjust the opening degrees of the cold air flow path 10a and the hot air flow path 10b. The sub temperature door 20b or 22b adjusts the opening degree of an auxiliary hot air flow path 10c.

Since the main temperature door 20a or 22a has a limited size due to the narrow space structure between a cooling heat exchanger 17 and a heating heat exchanger 18, the hot air flow path 10b on the side of the heating heat exchanger 18 corresponding to the main temperature door 20a or 22a is inevitably small.

Accordingly, a dead zone D having no air flow is formed near the heating heat exchanger 18. The sub temperature door 20b or 22b serves to increase the air flow amount on the side of the heating heat exchanger 18 by removing the dead zone D.

In addition, the temperature door 24 in the rear seat air flow path 16 is composed of a plurality of rear seat temperature doors 24. These rear seat temperature doors 24 adjust the temperature of the air supplied to the rear seat side of the vehicle interior. In particular, the rear seat temperature doors 24 control the temperature of the air discharged to the rear seat in cooperation with the sub temperature door 20b or 22b.

However, such a conventional individual air conditioning system has a drawback that, as shown in FIG. 1, actuators 30 and 32 are required to control the main temperature door 20a or 22a and the sub temperature door 20b or 22b.

This leads to a problem in that the number of parts increases, consequently increasing the manufacturing cost.

Particularly, in recent years, techniques for reducing the manufacturing cost are being demanded. However, the technique of controlling the main temperature door 20a or 22a and the sub temperature door 20b or 22b using the individual actuators 30 and 32 as described above cannot meet the demand for cost reduction.

SUMMARY

In view of the problems inherent in the related art, it is an object of the present invention to provide a vehicular air conditioning system capable of controlling a sub temperature door without a separate actuator.

Another object of the present invention is to provide a vehicular air conditioning system capable of reducing the number of parts and achieving cost reduction by adopting the configuration in which the sub temperature door can be controlled without a separate actuator.

In order to achieve these objects, there is provided a vehicular air conditioning system provided with a cooling heat exchanger and a heating heat exchanger, including: a cold air flow path through which an air passing through the cooling heat exchanger bypasses the heating heat exchanger; a hot air flow path through which the air passing through the cooling heat exchanger passes; a plurality of temperature doors configured to allow the air passing through the cooling heat exchanger to selectively pass through the heating heat exchanger; and an interlocking part configured to allow the temperature doors to be driven in conjunction with each other.

The system may further include: an auxiliary hot air flow path configured to allow the air to pass through the heating heat exchanger; a main temperature door configured to adjust an opening degree of the hot air flow path; and a sub temperature door configured to adjust an opening degree of the auxiliary hot air flow path, wherein the interlocking part may be configured to rotate the main temperature door and the sub temperature door in an interlocked manner at different angular velocities so that the opening degree of the main temperature door for the hot air flow path and the opening degree of the sub temperature door for the auxiliary hot air flow path can be made different from each other.

In the system, the interlocking part may be configured to make sure that the opening degree of the sub temperature door for the auxiliary hot air flow path is larger than the opening degree of the main temperature door for the hot air flow path.

In the system, the interlocking part may be configured to make sure that before the main temperature door reaches a position where the hot air flow path is opened to the maximum, the sub temperature door reaches a position where the auxiliary hot air flow path is opened to the maximum.

In the system, the interlocking part may be configured to make sure that even if the main temperature door moves in a direction of opening the hot air flow path after the sub temperature door reaches the position where the auxiliary hot air flow path is opened to the maximum, the sub temperature door is stopped for a predetermined time at the position where the auxiliary hot air flow path is opened to the maximum.

According to the vehicular air conditioning system of the present invention, the sub temperature door is controlled in conjunction with the main temperature door. Therefore, the sub temperature door can be controlled without a separate actuator.

Further, since the sub temperature door can be controlled without a separate actuator, it is possible to reduce the number of parts and achieve cost reduction.

DETAILED DESCRIPTION

Preferred embodiments of a vehicular heat management system according to the present invention will now be described in detail with reference to the accompanying drawings.

Prior to describing the features of the vehicular air conditioning system according to the present invention, the general configuration of an individual air conditioning system will be briefly described with reference to FIGS. 2 and 3.

Figure 3:
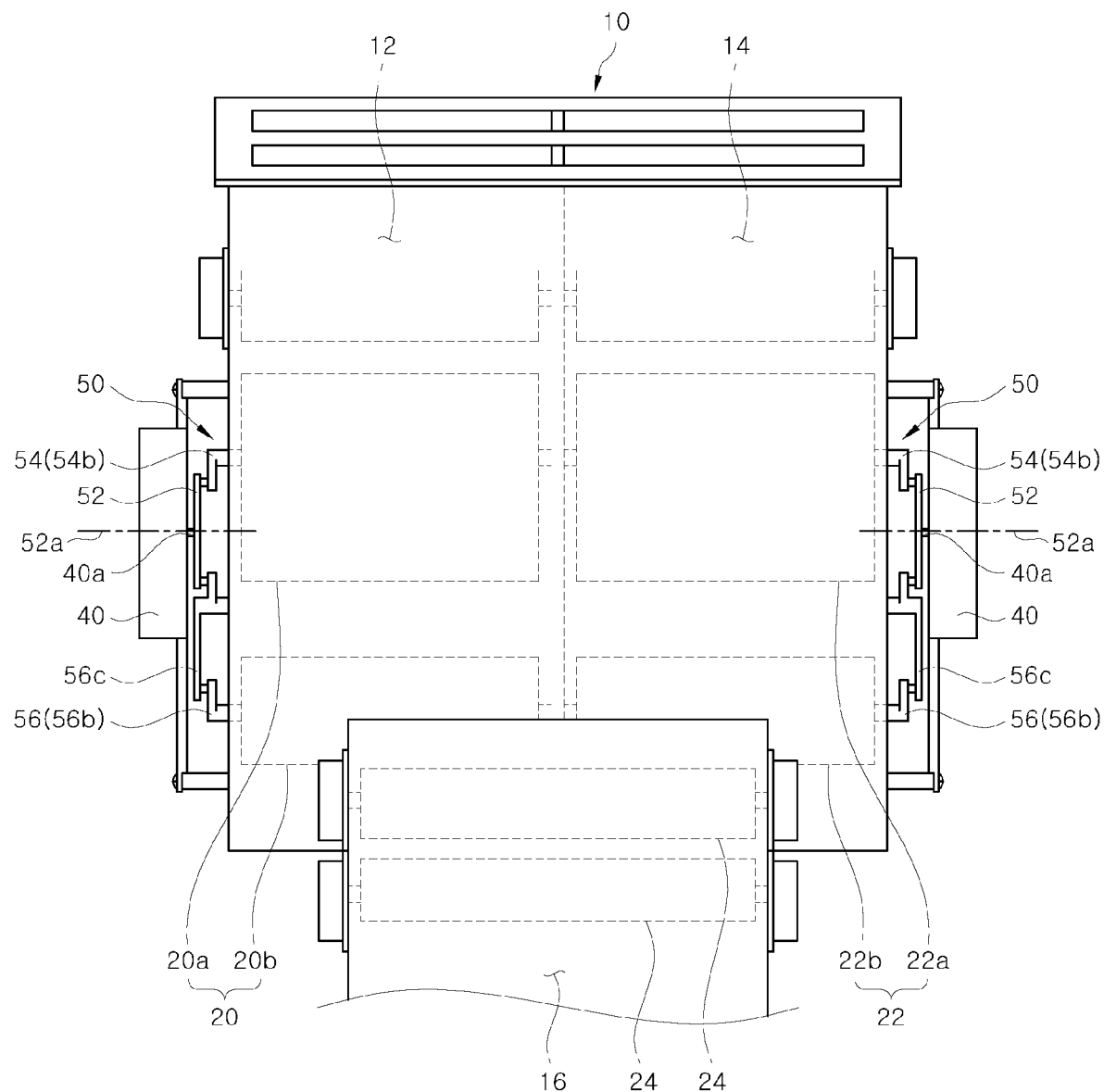
FIG. 3 is a view showing the configuration of a vehicular air conditioning system according to the present invention.

As shown in FIG. 3, the individual air conditioning system has a structure in which an air flow path of an air conditioning case 10 is divided into a driver seat air flow path 12, a front passenger seat air flow path 14 and a rear seat air flow path 16, and temperature doors 20, 22 and 24 are installed in the air flow paths 12, 14 and 16 for respective seats.

In such an individual air conditioning system, when a user operates an individual air conditioning mode switch (not shown) and a temperature control switch (not shown) for each air conditioning region, the temperature door 20, 22 and 24 in the air flow paths 12, 14 and 16 are controlled independently. Therefore, the temperature of the air supplied to each air conditioning region is individually controlled to individually cool and heat each air conditioning region.

Figure 1:
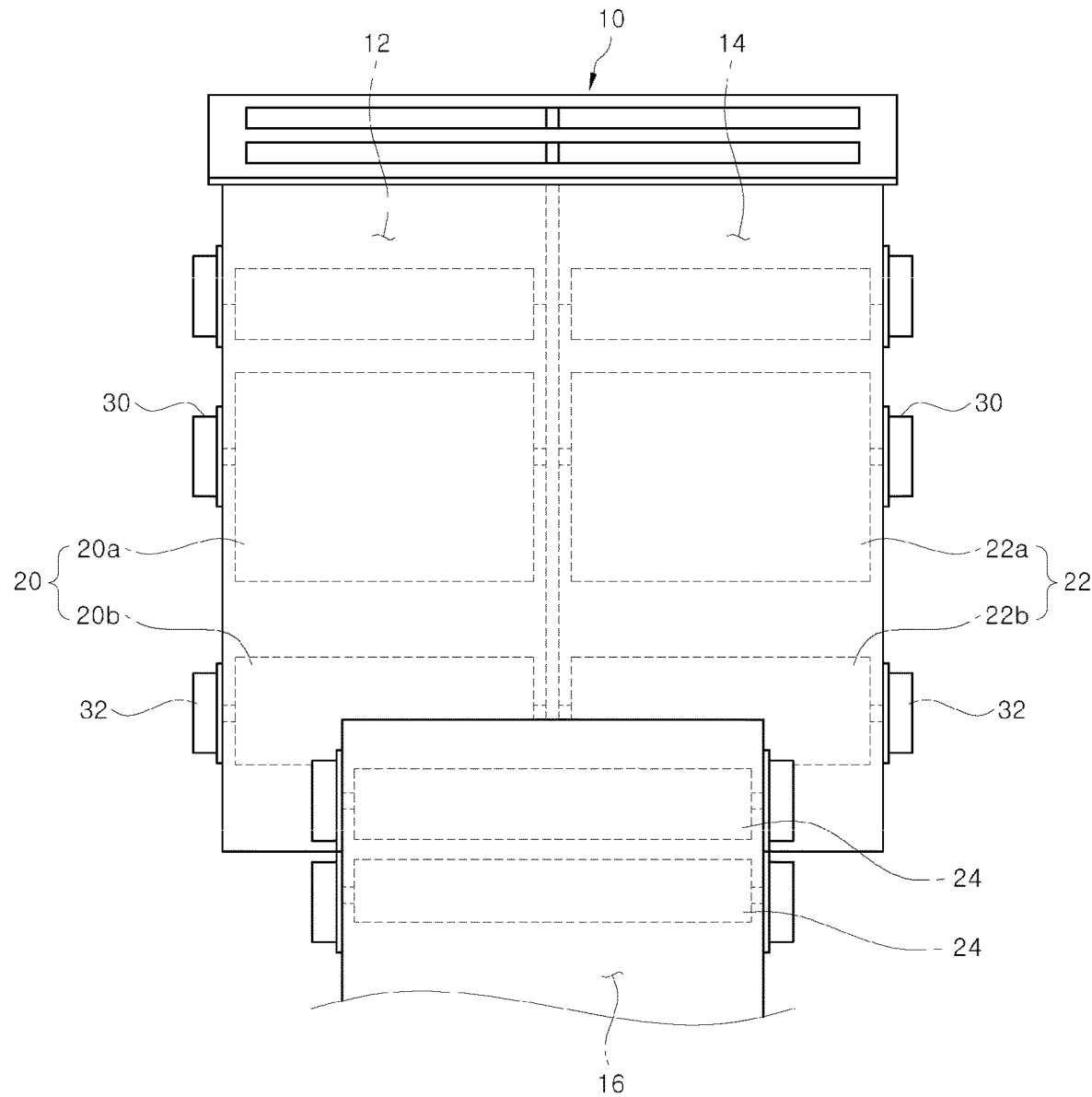
FIG. 1 is a view of a conventional vehicular air conditioning system, showing a structure for individually cooling and heating a driver seat region, a front passenger seat region and a rear seat region.
Figure 2:
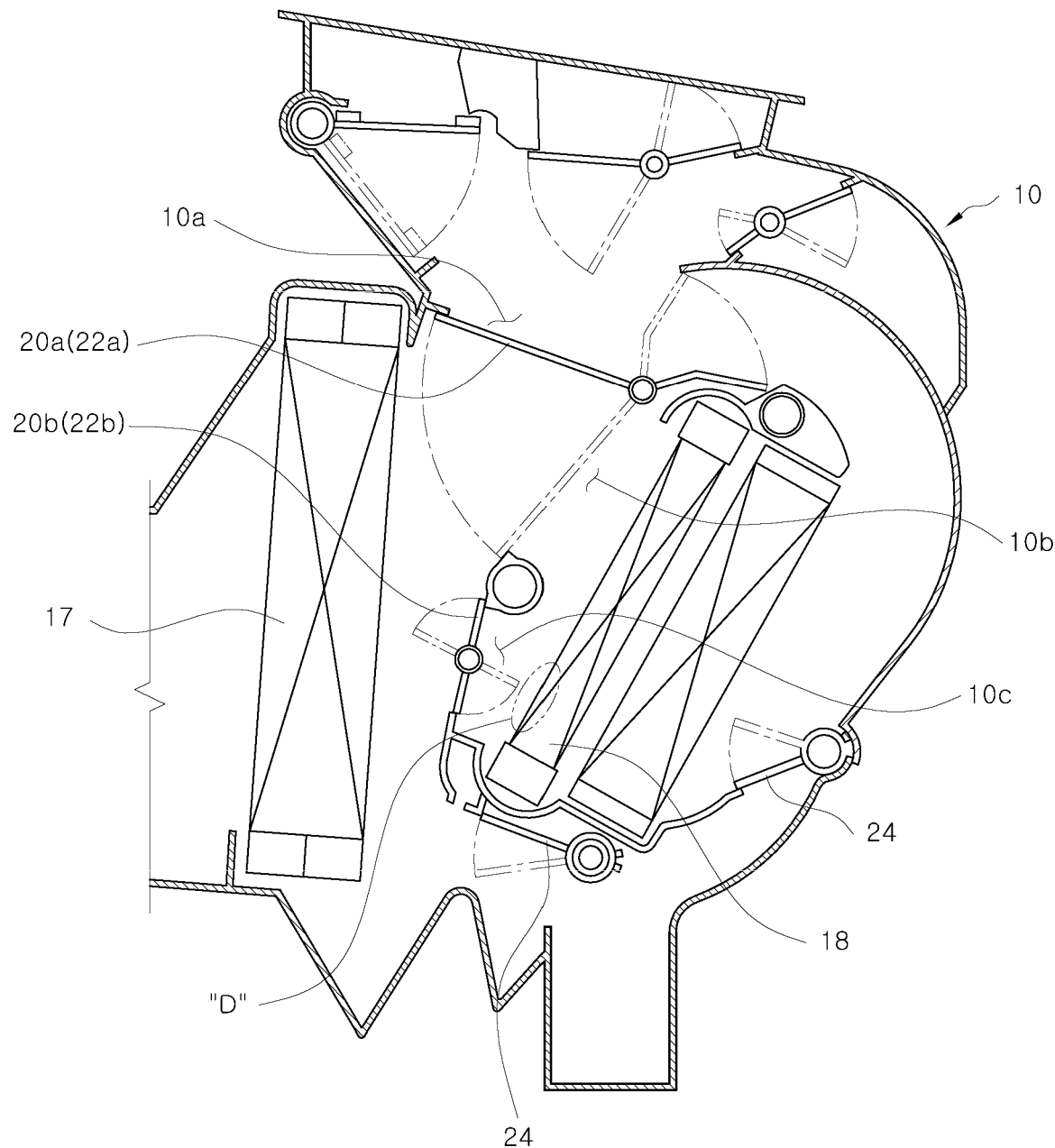
FIG. 2 is a side sectional view of the conventional vehicular air conditioning system shown in FIG. 1, showing a main temperature door and a sub temperature door.

Meanwhile, as shown in FIG. 2, each of the temperature doors 20 and 22 in the driver seat air flow path 12 and the front passenger seat air flow path 14 includes a main temperature door 20a or 22a and a sub temperature door 20b or 22b. In this case, the main temperature door 20a or 22a rotates between a cold air flow path 10a and a hot air flow path 10b to adjust the opening degrees of the cold air flow path 10a and the hot air flow path 10b. The sub temperature door 20b or 22b adjusts the opening degree of an auxiliary hot air flow path 10c.

The cold air flow path 10a is configured such that the air passing through a cooling heat exchanger 17 bypasses a heating heat exchanger 18. The hot air flow path 10b is configured so that the air passing through the cooling heat exchanger 17 passes through the heating heat exchanger 18. The temperature doors 20a, 22a, 20b and 22b are configured to allow the air passing through the cooling heat exchanger 17 to selectively pass through the heating heat exchanger 18.

In addition, the temperature door 24 in the rear seat air flow path 16 is composed of a plurality of rear seat temperature doors 24. These rear seat temperature doors 24 adjust the temperature of the air supplied to the rear seat side of the vehicle interior. In particular, the rear seat temperature doors 24 control the temperature of the air discharged to the rear seat in cooperation with the sub temperature door 20b or 22b.

Next, the features of the vehicular air conditioning system according to the present invention will be described in detail with reference to FIGS. 3 to 7.

Referring first to FIG. 3, the vehicular air conditioning system of the present invention includes a temperature actuator 40 for driving the temperature doors 20 and 22 in the driver seat air flow path 12 and the front passenger seat air flow path 14.

The temperature actuator 40, which rotates forward and backward in response to a control signal applied thereto, is fixedly installed on both sides of the air conditioning case 10 to simultaneously drive the main temperature doors 20a and 22a and the sub temperature doors 20b and 22b constituting the temperature doors 20 and 22 in the driver seat air flow path 12 and the front passenger seat air flow path 14.

Since the temperature actuator 40 simultaneously drives the main temperature doors 20a and 22a and the sub temperature doors 20b and 22b, a single temperature actuator 40 is provided for the driver seat air flow path 12 and the front passenger seat air flow path 14.

Referring again to FIG. 3, the air conditioning system of the present invention further includes an interlocking part 50 configured to transmit the driving force of the temperature actuator 40 to the main temperature doors 20a and 22a and the sub temperature doors 20b and 22b and to interlock the main temperature doors 20a and 22a and the sub temperature doors 20b and 22b with each other. Hereinafter, the main temperature doors 20a and 22a and the sub temperature doors 20b and 22b installed in the driver seat air flow path 12 and the front passenger seat air flow path 14 will not be distinguished from each other and will be described in a unified way.

Figure 4:
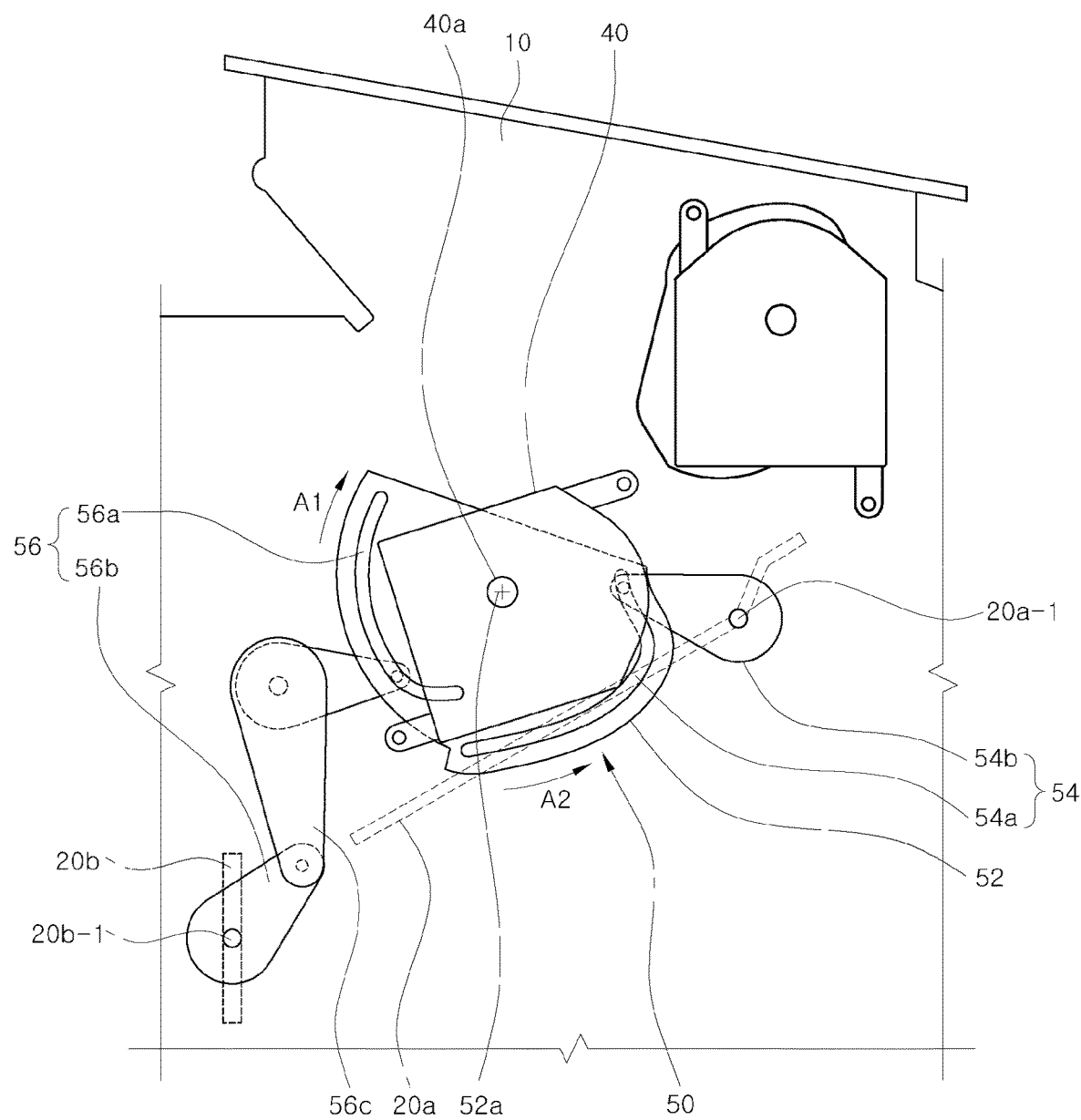
FIG. 4 is a side view of an air conditioning case, showing a driving part for driving the main temperature door and the sub temperature door on the side of a driver seat air flow path constituting the present invention.
Figure 5:
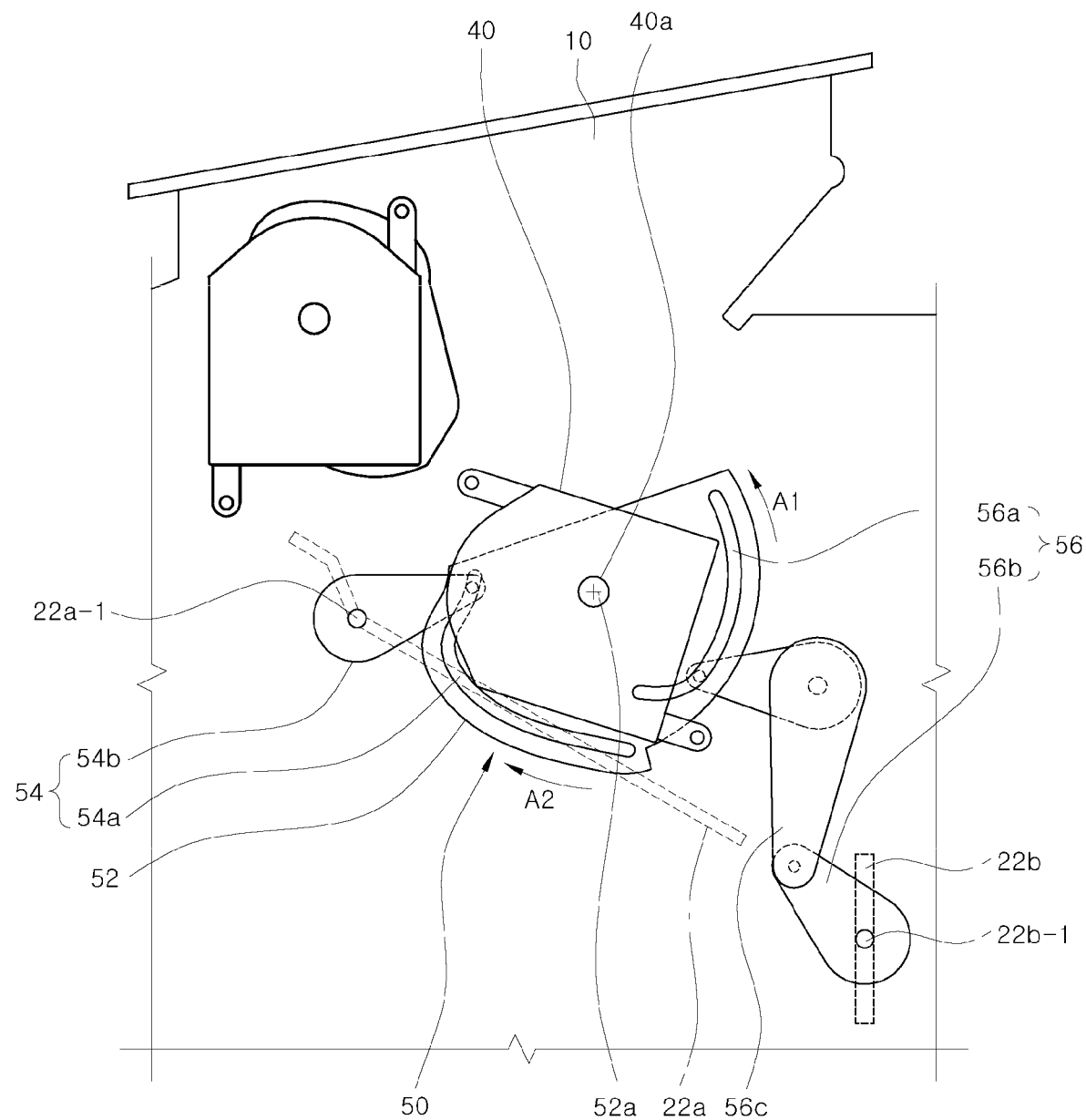
FIG. 5 is a side view of the air conditioning case, showing a driving part for driving the main temperature door and the sub temperature door on the side of a front passenger seat air flow path constituting the present invention.

As shown in FIGS. 3 to 5, the interlocking part 50 includes a temperature cam 52 installed on an output shaft 40a of the temperature actuator 40, a first rotational force transmission part 54 configured to transmit the rotational force of the temperature cam 52 to the main temperature doors 20*a* and 22*a*, and a second rotational force transmission part 56 configured to transmit the rotational force of the temperature cam 52 to the sub temperature doors 20*b* and 22*b*.

The temperature cam 52 receives the driving force of the temperature actuator 40 and rotates forward and backward between a cooling direction A1 and a heating direction A2.

The first rotational force transmission part 54 includes a first slot 54*a* formed in the temperature cam 52 so as to be curved along the circumferential direction, and a first arm 54*b* integrally fixed to the rotation shafts 20*a*-1 and 22*a*-1 of the main temperature doors 20*a* and 22*a* and having a distal end movably fitted to the first slot 54*a*.

In the first rotational force transmission part 54, as the temperature cam 52 rotates forward and backward, the first slot 54*a* also rotates forward and backward at the same time. As the first slot 54*a* also rotates forward and backward, the first arm 54*b* connected thereto also rotates forward and backward in conformity with the curved shape of the first slot 54*a*. As the first arm 54*b* rotates forward and backward, the main temperature doors 20*a* and 22*a* connected to the first arm 54*b* also rotate forward and backward at specific angles to adjust the opening degrees of the cold air flow path 10*a* and the hot air flow path 10*b* (see FIG. 2).

The rotation angle of the first arm 54*b* varies according to the curved shape of the first slot 54*a*. Since the rotational position of the first arm 54*b* is variable according to the curved shape of the first slot 54*a*, the opening positions of the main temperature doors 20*a* and 22*a* also vary accordingly.

The second rotational force transmission part 56 includes a second slot 56*a* formed in the temperature cam 52 so as to be curved along the circumferential direction, and a second arm 54*b* integrally fixed to the rotation shafts 20*b*-1 and 22*b*-1 of the sub temperature doors 20*b* and 22*b* and having a distal end movably connected to the second slot 56*a*.

In the second rotational force transmission part 56, as the temperature cam 52 rotates forward and backward, the second slot 56*a* also rotates forward and backward at the same time. As the second slot 56*a* also rotates forward and backward, the second arm 56*b* connected thereto also rotates forward and backward in conformity with the curved shape of the second slot 56*a*. As the second arm 56*b* rotates forward and backward, the sub temperature doors 20*b* and 22*b* connected to the second arm 56*b* also rotate forward and backward at specific angles to adjust the opening degree of the auxiliary hot air flow path 10*c* (see FIG. 2).

The rotation angle of the second arm 56*b* varies according to the curved shape of the second slot 56*a*. Since the rotational position of the second arm 56*b* is variable according to the curved shape of the second slot 56*a*, the opening positions of the sub temperature doors 20*b* and 22*b* also vary accordingly.

When the sub temperature doors 20*b* and 22*b* are located far from the temperature cam 52, the second slot 56*a* on the side of the temperature cam 52 and the second arm 56*b* on the side of the sub temperature doors 20*b* and 22*b* are connected to each other through a separate link 56*c*.

According to the interlocking part 50 having such a structure, the main temperature doors 20*a* and 22*a* and the sub temperature doors 20*b* and 22*b* are simultaneously controlled by the driving force outputted from the single temperature actuator 40, and are interlocked with each other. Therefore, unlike the prior art, there is no need to separately install two actuators for controlling the main temperature doors 20*a* and 22*a* and the sub temperature doors 20*b* and 22*b*.

In addition, since there is no need to separately install two actuators for controlling the main temperature doors 20*a* and 22*a* and the sub temperature doors 20*b* and 22*b*, it is possible to reduce the number of parts and achieve cost reduction.

Referring to FIGS. 4 to 7, the interlocking part 50 is configured to rotate the main temperature doors 20*a* and 22*a* and the sub temperature doors 20*b* and 22*b* in an interlocked state at different angular velocities.

More specifically, the interlocking part 50 receives the driving force of the temperature actuator 40 to rotate the main temperature doors 20*a* and 22*a* and the sub temperature doors 20*b* and 22*b* in an interlocked state at different angular velocities.

To this end, in the interlocking part 50, the curved shapes of the first slot 54*a* and the second slot 56*a* of the temperature cam 52 that determines the positions of the main temperature doors 20*a* and 22*a* and the sub temperature doors 20*b* and 22*b* according to the rotational positions are made different from each other.

In particular, the trajectories of the first slot 54*a* and the second slot 56*a* with respect to the rotation center axis 52*a* of the temperature cam 52 are set to be different from each other, so that when the temperature cam 52 rotates, the main temperature doors 20*a* and 22*a* and the sub temperature doors 20*b* and 22*b* are controlled to have different angular velocities.

Accordingly, when the temperature cam 52 is rotated, the opening speed of the main temperature doors 20*a* and 22*a* for the cold and hot air flow paths 10*a* and 10*b*, and the opening speed of the sub temperature doors 20*b* and 22*b* for the auxiliary hot air flow path 10*c* are made different from each other.

Thus, when the temperature cam 52 is rotated to a specific position, the opening position of the main temperature doors 20*a* and 22*a* for the cold and hot air flow paths 10*a* and 10*b*, and the opening position of the sub temperature doors 20*b* and 22*b* for the auxiliary hot air flow path 10*c* are made different from each other.

Particularly, the opening position of the main temperature doors 20*a* and 22*a* for the hot air flow path 10*b*, and the opening position of the sub temperature doors 20*b* and 22*b* for the auxiliary hot air flow path 10*c* are made different from each other.

Figure 6:
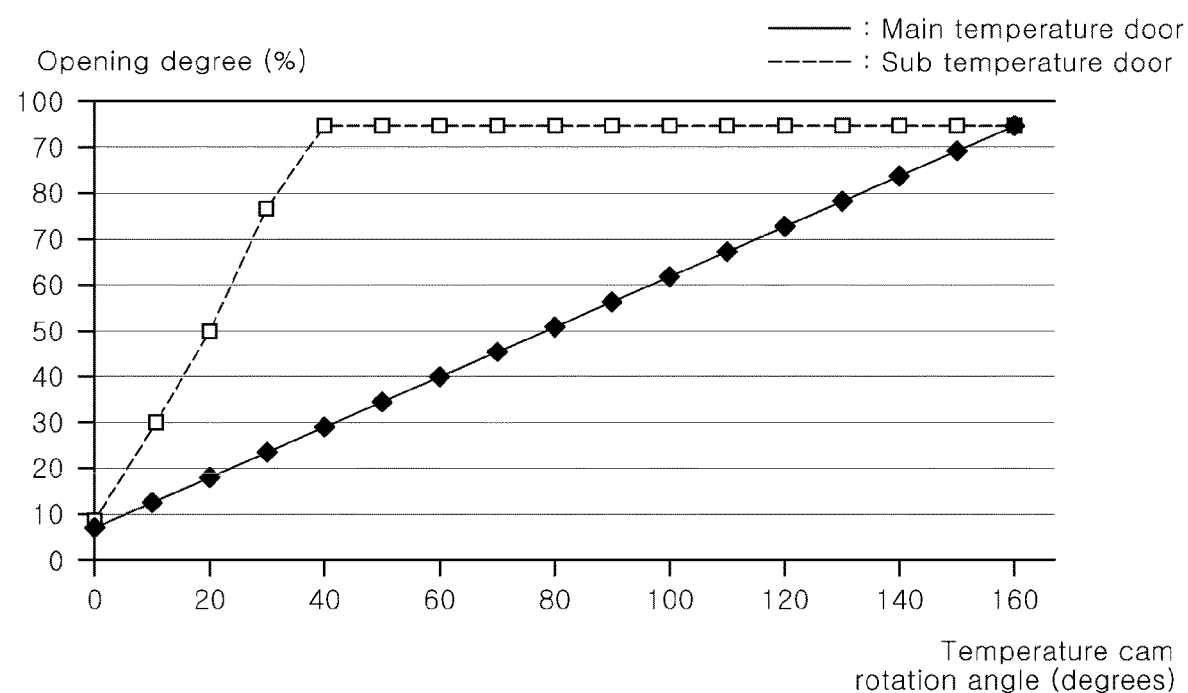
FIG. 6 is an operation diagram illustrating an operation example of the present invention, and is a graph showing the opening degrees of the main temperature door and the sub temperature door according to the rotation position of a temperature cam.
Figure 7:
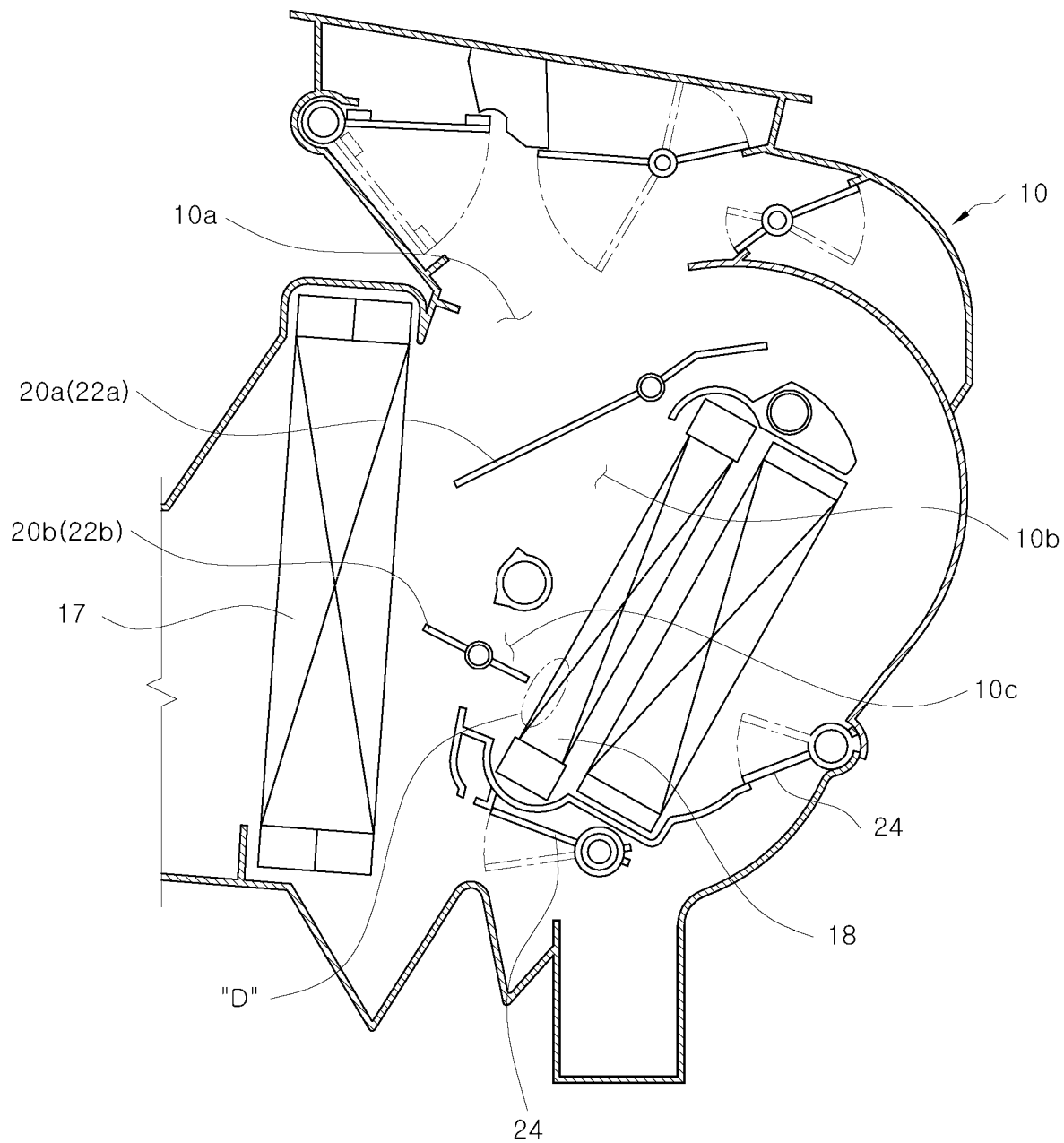
FIG. 7 is a side sectional view of the vehicular air conditioning system shown in FIG. 3, showing the main temperature door and the sub temperature door.

As a result, as shown in FIG. 6, the opening degree of the main temperature doors 20*a* and 22*a* for the hot air flow path 10*b*, and the opening degree of the sub temperature doors 20*b* and 22*b* for the auxiliary hot air flow path 10*c* are made different from each other according to the rotational position of the temperature cam 52.

Preferably, the first slot 54*a* and the second slot 56*a* have trajectories for making the angular velocities of the main temperature doors 20*a* and 22*a* and the sub temperature doors 20*b* and 22*b* different from each other to control the angular velocity of the sub temperature doors 20*b* and 22*b* to be faster than the angular velocity of the main temperature doors 20*a* and 22*a*.

In particular, the first slot 54*a* and the second slot 56*a* have trajectories for controlling the angular velocity of the sub temperature doors 20*b* and 22*b* to be faster than the angular velocity of the main temperature doors 20*a* and 22*a* when the temperature cam 52 is rotated from the cooling direction A1 to the heating direction A2.

Thus, when the temperature cam 52 is rotated from the cooling direction A1 to the heating direction A2, the opening speed of the sub temperature doors 20*b* and 22*b* for the auxiliary hot air flow path 10c is made faster than the opening speed of the main temperature doors 20a and 22a for the hot air flow path 10b.

As a result, as shown in FIG. 6, when the temperature cam 52 is rotated from the cooling direction A1 to the heating direction A2, the opening degree of the sub temperature doors 20b and 22b for the auxiliary hot air flow path 10c is larger than the opening degree of the main temperature doors 20a and 22a for the hot air flow path 10b.

More preferably, the first slot 54a and the second slot 56a have trajectories for controlling the angular velocity of the sub temperature doors 20b and 22b to be faster than the angular velocity of the main temperature doors 20a and 22a and consequently controlling the opening degree of the sub temperature doors 20b and 22b to be larger than the opening degree of the main temperature doors 20a and 22a when the temperature cam 52 is rotated from the cooling direction A1 to the heating direction A2, and have trajectories for controlling the opening degree of the sub temperature doors 20b and 22b for the auxiliary hot air flow path 10c to be 100% (opened to the maximum) before the opening degree of the main temperature doors 20a and 22a for the hot air flow path 10b is controlled to be 100% (opened to the maximum).

The reason for adopting this configuration is to make sure that a large amount of hot air can be introduced into the rear seat air flow path 16 corresponding to the auxiliary hot air flow path 10c regardless of the opening degree of the hot air flow path 10b by controlling the opening degree of the sub temperature doors 20b and 22b to be 100% before the opening degree of the main temperature doors 20a and 22a is controlled to be 100%.

Even more preferably, the first slot 54a and the second slot 56a have trajectories for controlling the angular velocity of the sub temperature doors 20b and 22b to be faster than the angular velocity of the main temperature doors 20a and 22a and consequently controlling the opening degree of the sub temperature doors 20b and 22b to be 100% before the opening degree of the main temperature doors 20a and 22a is controlled to be 100% when the temperature cam 52 is rotated from the cooling direction A1 to the heating direction A2, and have trajectories for controlling the opening degree of the sub temperature doors 20b and 22b to be 100% before the opening degree of the main temperature doors 20a and 22a is controlled to be ⅔.

In addition, the first slot 54a and the second slot 56a of the interlocking part 50 have trajectories for making sure that the sub temperature doors 20b and 22b reach a position where the auxiliary hot air flow path 10c is opened to the maximum before the main temperature doors 20a and 22a reach a position where the hot air flow path 10b is opened to the maximum.

In addition, the first slot 54a and the second slot 56a of the interlocking part 50 have trajectories for making sure that even if the main temperature doors 20a and 22a move in the direction of opening the hot air flow path 10b after the sub temperature doors 20b and 22b reach a position where the auxiliary hot air flow path 10c is opened to the maximum, the sub temperature doors 20b and 22b are stopped for a predetermined time at the position where the auxiliary hot air flow path 10c is opened to the maximum.

In addition, the first slot 54a and the second slot 56a of the interlocking part 50 have trajectories for making sure that if the main temperature doors 20a and 22a move in the direction of closing the hot air flow path 10b after the sub temperature doors 20b and 22b reach a position where the auxiliary hot air flow path 10c is opened to the maximum, the sub temperature doors 20b and 22b are moved in the direction of closing the auxiliary hot air flow path 10c.

In addition, the first slot 54a and the second slot 56a of the interlocking part 50 have trajectories for making sure that before the main temperature doors 20a and 22a reach a position where they open ½ of the hot air flow path 10b, the sub temperature doors 20b and 22b reach a position where the auxiliary hot air flow path 10c is opened to the maximum.

In addition, the first slot 54a and the second slot 56a of the interlocking part 50 is configured to make sure that when the sub temperature doors 20b and 22b reach a position where the auxiliary hot air flow path 10c is opened to the maximum, the opening angle of the rear seat temperature door 24 is adjusted to control the temperature of the air discharged toward the rear seat.

In addition, the first slot 54a and the second slot 56a of the interlocking part 50 is configured to make sure that before the sub temperature doors 20b and 22b reach a position where the auxiliary hot air flow path 10c is opened to the maximum, the opening angle of the sub temperature doors 20b and 22b and the opening angle of the rear seat temperature door 24 are simultaneously adjusted to control the temperature of the air discharged toward the rear seat.

According to the interlocking part 50 having such a structure, the main temperature doors 20a and 22a and the sub temperature doors 20b and 22b are interlocked with each other, and the angular velocities of the main temperature doors 20a and 22a and the sub temperature doors 20b and 22b are made different from each other. Therefore, the opening degree of the main temperature doors 20a and 22a for the hot air flow path 10b and the opening degree of the sub temperature doors 20b and 22b for the auxiliary hot air flow path 10c can be made different from each other.

In addition, since the opening degree of the main temperature doors 20a and 22a for the hot air flow path 10b and the opening degree of the sub temperature doors 20b and 22b for the auxiliary hot air flow path 10c can be made different from each other, it is possible to increase the amount of hot air supplied to the front and rear seats, which makes it possible to improve the cooling and heating performance for the front and rear seats.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system provided with a cooling heat exchanger and a heating heat exchanger, comprising:
    a cold air flow path through which an air passing through the cooling heat exchanger bypasses the heating heat exchanger;
    a hot air flow path through which the air passing through the cooling heat exchanger passes;
    a plurality of temperature doors configured to allow the air passing through the cooling heat exchanger to selectively pass through the heating heat exchanger; and
    an interlocking part configured to allow the temperature doors to be driven in conjunction with each other,
    an auxiliary hot air flow path configured to allow the air to pass through the heating heat exchanger;
    a main temperature door configured to adjust an opening degree of the hot air flow path; and a sub temperature door configured to adjust an opening degree of the auxiliary hot air flow path,
wherein the interlocking part is configured to rotate the main temperature door and the sub temperature door in an interlocked manner at different angular velocities so that the opening degree of the main temperature door for the hot air flow path and the opening degree of the sub temperature door for the auxiliary hot air flow path can be made different from each other, and
wherein the interlocking part is configured to make sure that the opening degree of the sub temperature door for the auxiliary hot air flow path is larger than the opening degree of the main temperature door for the hot air flow path.

2. The system of claim 1, wherein the interlocking part is configured to make sure that before the main temperature door reaches a position where the hot air flow path is opened to the maximum, the sub temperature door reaches a position where the auxiliary hot air flow path is opened to the maximum.

3. The system of claim 2, wherein the interlocking part is configured to make sure that even if the main temperature door moves in a direction of opening the hot air flow path after the sub temperature door reaches the position where the auxiliary hot air flow path is opened to the maximum, the sub temperature door is stopped for a predetermined time at the position where the auxiliary hot air flow path is opened to the maximum.

4. The system of claim 3, wherein the interlocking part is configured to make sure that if the main temperature door moves in a direction of closing the hot air flow path after the sub temperature door reaches the position where the auxiliary hot air flow path is opened to the maximum, the sub temperature door is moved in a direction of closing the auxiliary hot air flow path.

5. The system of claim 4, further comprising:
a rear seat air flow path configured to supply a cold air and a hot air to a rear seat of a vehicle interior; and
at least one rear seat temperature door installed in the rear seat air flow path,
wherein the main temperature door is configured to control a temperature of an air discharged to a front seat of the vehicle interior, and the sub temperature door and the rear seat temperature door are configured to control a temperature of an air discharged to the rear seat of the vehicle interior.

6. The system of claim 5, wherein the interlocking part is configured to make sure that before the main temperature door reaches a position where the main temperature door opens ½ of the hot air flow path, the sub temperature door reaches the position where the auxiliary hot air flow path is opened to the maximum.

7. The system of claim 6, wherein the interlocking part is configured to make sure that when the sub temperature door reaches the position where the auxiliary hot air flow path is opened to the maximum, the opening angle of the rear seat temperature door is adjusted to control the temperature of the air discharged toward the rear seat, and further that before the sub temperature door reaches a position where the auxiliary hot air flow path is opened to the maximum, the opening angle of the sub temperature door and the opening angle of the rear seat temperature door are adjusted to control the temperature of the air discharged toward the rear seat.

8. The system of claim 2, wherein the interlocking part is configured to interlock the main temperature door and the sub temperature door so that the opening degree of the sub temperature door for the auxiliary hot air flow path becomes 100% before the opening degree of the main temperature door for the hot air flow path is controlled to be ⅔.

9. The system of claim 1, further comprising:
a single temperature actuator configured to rotate forward and backward in response to a control signal applied thereto,
wherein the interlocking part is configured to transmit a driving force of the temperature actuator to the main temperature door and the sub temperature door and to interlock the main temperature door and the sub temperature door with each other.

10. The system of claim 9, wherein the interlocking part includes a temperature cam configured to receive the driving force of the temperature actuator to rotate forward and backward in a cooling direction and a heating direction, a first rotational force transmission part configured to transmit a rotational force of the temperature cam to the main temperature door, and a second rotational force transmission part configured to transmit the rotational force of the temperature cam to the sub temperature door, and
the temperature cam, the first rotational force transmission part and the second rotational force transmission part are configured to operatively connect and rotate the main temperature door and the sub temperature door in an interlocked manner.

11. The system of claim 10, wherein the first rotational force transmission part includes a first slot formed along a circumferential direction of the temperature cam so as to have a trajectory having a specific shape, and a first arm integrally fixed to a rotation shaft of the main temperature door and having a distal end movably fitted to the first slot, and
the first arm is configured to, when the temperature cam is rotated, move along the trajectory of the first slot to variably control an opening position of the main temperature door with respect to the cold air flow path and the hot air flow path.

12. The system of claim 11, wherein the second rotational force transmission part includes a second slot formed along the circumferential direction of the temperature cam so as to have a trajectory having a specific shape, and a second arm integrally fixed to a rotation shaft of the sub temperature door and having a distal end movably connected to the second slot, and
the second arm is configured to, when the temperature cam is rotated, move along the trajectory of the second slot to variably control an opening position of the sub temperature door with respect to the auxiliary hot air flow path.

13. The system of claim 12, further comprising:
a separate link configured to connect each of the slots of the temperature cam and each of the arms,
wherein the link is configured to operatively connect the temperature cam and each of the arms when the distance between the temperature cam and each of the arms becomes equal to or longer than a predetermined distance.

* * * * *